United States Patent
Zhang et al.

(10) Patent No.: US 8,094,747 B2
(45) Date of Patent: Jan. 10, 2012

(54) TRANSMIT METHODS FOR CCFI/PCFICH IN A WIRELESS COMMUNICATION SYSTEM

(75) Inventors: Jianzhong Zhang, Irving, TX (US); Joonyoung Cho, Suwon-si (KR); Zhouyue Pi, Richardson, TX (US); Farooq Khan, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 734 days.

(21) Appl. No.: 12/213,012

(22) Filed: Jun. 12, 2008

(65) Prior Publication Data

US 2009/0015443 A1    Jan. 15, 2009

Related U.S. Application Data

(60) Provisional application No. 60/929,791, filed on Jul. 12, 2007, provisional application No. 60/929,869, filed on Jul. 16, 2007.

(51) Int. Cl.
    *H04L 27/00* (2006.01)
(52) U.S. Cl. ........ 375/295; 375/260; 375/302; 375/267; 375/299; 375/303; 375/395; 375/316; 375/298; 370/342; 341/67
(58) Field of Classification Search ............... 375/260, 375/302, 367, 299, 303, 298; 370/342; 341/67
    See application file for complete search history.

(56) References Cited

U.S. PATENT DOCUMENTS

| | | | |
|---|---|---|---|
| 6,882,636 B1 | 4/2005 | Kim et al. | |
| 7,629,902 B2 * | 12/2009 | Zhang et al. | 341/106 |
| 2003/0194992 A1 | 10/2003 | Kim et al. | |
| 2007/0036067 A1 | 2/2007 | Zhang et al. | |
| 2008/0267158 A1 * | 10/2008 | Zhang et al. | 370/342 |

FOREIGN PATENT DOCUMENTS

RU    2 236 752 C2    9/2004

(Continued)

OTHER PUBLICATIONS

3GPP TS 36.300 V8.1.0; 3rd Generation Partnership Project; Technical Specification Group Radio Access network; Evolved Universal Terrestrial Radio Access (E-UTRA) and Evolved Universal Terrestrial Radio Access Network (E-UTRAN); Overall description; Stage 2 (Release 8); Jul. 3, 2007 (http://www.3gpp.org/ftp/Specs/2007-06/Rel-8/36_series/36300-810.zip).

(Continued)

*Primary Examiner* — Siu Lee (57) ABSTRACT

A method of transmitting a control channel format indicator (CCFI), also known as PCFICH (Physical Control Format Indicator Channel), in case where the length of a coded CCFI is not an integer multiple of three, including mapping a plurality of two-bit CCFI into a codebook with each component codeword having three bits; generating a sequence of codewords selected from the codebook by repeating the selected component codeword for predetermined times; generating a codeword by concatenating the sequence of the selected component codewords with the original CCFI bits; and transmitting the codeword carrying information of CCFI. The method further includes a step of generating a permutation of each of the four codewords by assigning K repetitions of the three-bit component codeword to the number of K resource units respectively and mapping remaining K bits of each of the four codewords separately to the number of K resource units.

22 Claims, 5 Drawing Sheets

FOREIGN PATENT DOCUMENTS

RU       2 251 224 C2    4/2005
WO   WO 2007/063393 A2   6/2007

OTHER PUBLICATIONS

3GPP TS 36.211 V8.0.0; 3rd Generation Partnership Project; Technical Specification Group Radio Access network; Evolved Universal Terrestrial Radio Access (E-UTRA); Physical channels and modulation (Release 8); Sep. 27, 2007 (http://www.3gpp.org/ftp/Specs/2007-09/Rel-8/36_series/36211-800.zip).

Miki, N. et al.; 'Investigation on Optimum Coding and Multiplexing Schemes for L1/L2 Control Signals in OFDM based Evolved UTRA Downlink'; Personal, Indoor and Mobile Radio Communications, 2007. PIMRC 2007. IEEE 18th International Symposium on; Sep. 3-7, 2007;pp. 1-6.

International Search Report dated Nov. 28, 2008 in Applicant's corresponding International Patent Application No. PCT/KR2008/004117.

U.S. Appl. No. 60/924,020, filed Apr. 26, 2007, Zhang.

3GPP RAN WG1#48bis *Chairman's Notes*, Malta, Mar. 2007.

R1-050271, *"Evaluation of Diversity in Evolved UTRA"*, Samsung, RAN1#40bis, Beijing China, Apr. 2005.

3GPP TSG RAN WG1 Meeting #49bis, R1-073098, Samsung, Coding for CCFI Transmission, Jun. 29, 2007; pp. 1-3.

3GPP TSG RAN WG1 #49bis, R1-072722, Mitsubishi Electric, on fourth value of CCFI (Cat0); Jun. 29, 2007; pp. 1-2.

\* cited by examiner

Figure 1

|      | t1    | t2      |
|------|-------|---------|
| ANT1 | $S_1$ | $-S_2^*$ |
| ANT2 | $S_2$ | $S_1^*$  |

Figure 2

|      | f1    | f2      |
|------|-------|---------|
| ANT1 | $S_1$ | $-S_2^*$ |
| ANT2 | $S_2$ | $S_1^*$  |

TRANSMIT METHODS FOR CCFI/PCFICH IN A WIRELESS COMMUNICATION SYSTEM

CLAIM OF PRIORITY

This application makes reference to, incorporates the same herein, and claims all benefits accruing under 35 U.S.C.§119 from applications earlier filed in the U.S. Patent & Trademark Office on 12 Jul. 2007 and there duly assigned Ser. No. 60/929,791, and on 16 Jul. 2007 and there duly assigned Ser. No. 60/929,869, respectively.

BACKGROUND OF THE INVENTION

1. Field of the Invention

The present invention relates to a method and apparatus for coding a CCFI (Control Channel Format Indicator) channel, also known as PCFICH (Physical Control Format Indicator Channel), and more particularly, to a method and apparatus for coding a CCFI channel using a concatenation of repeated (3,2) codewords and original CCFI bits, for the case where a total result coded length of CCFI is not an integer multiple of three.

2. Description of the Related Art

Three references of the present invention are listed as below.

[1]. 3GPP RAN WG1#48bis Chairman's Notes, March 2007, Malta.

[2]. R1-050271, "Evaluation of Diversity in Evolved UTRA", Samsung, RAN1#40bis, Beijing China, April 2005.

[3]. "Transmit Diversity for Acknowledgement and Category 0 bits in a Wireless communication System", earlier filed provisional in the U.S. Patent & Trademark Office on 26 Apr. 2007 and there duly assigned Ser. No. 60/924,020 and earlier filed provisional in the U.S. Patent & Trademark Office on 9 May, 2007 and there duly assigned Ser. No. 60/924,339.

Reference [3] discusses several approaches of coding and transmit diversity for both the Category 0 bits and ACK/NACK channels.

Orthogonal Frequency Division Multiplexing (OFDM) is a technology to multiplex data in frequency domain. Modulation symbols are carried on frequency sub-carriers. The total bandwidth in an OFDM system is divided into narrowband frequency units called subcarriers. The number of subcarriers is equal to the FFT/IFFT size N used in the system. In general, the number of subcarriers used for data is less than N because some of the subcarriers located at the edge of the frequency spectrum are reserved as guard subcarriers. In general, no information may be transmitted on guard subcarriers.

A typical cellular radio system includes a collection of fixed base stations (BS) that define a radio coverage area or a cell. Typically, a non-line-of-sight (NLOS) radio propagation path exists between a base station and a mobile station due to natural and man-made objects that are situated between the base station and the mobile station. As a consequence, the radio waves propagate via reflections, diffractions and scattering. The arriving waves at the mobile station (MS) in the downlink direction (at the BS in the uplink direction) experience constructive and destructive additions because of different phases of the individual waves. This is due the fact that, at high carrier frequencies typically used in the cellular wireless communication, small changes in the differential propagation delays introduces large changes in the phases of the individual waves. When the MS is moving or changes occur in the scattering environment, the spatial variations in the amplitude and phase of the composite received signal will manifest themselves as the time variations known as Rayleigh fading or fast fading. The time-varying nature of the wireless channel requires very high signal-to-noise ratio (SNR) in order to provide desired bit error or packet error reliability.

Diversity is widely used to combat the effect of fast fading. The idea is to provide the receiver with multiple faded replicas of the same information-bearing signal. On the assumption of independent fading of each of the antenna branches, the probability that the instantaneous SNR is below a certain threshold on each branch is approximately $p^L$ where p is the probability that the instantaneous SNR is below the certain threshold on each antenna branch.

The methods of diversity generally fall into the following categories: space, angle, polarization, field, frequency, time and multipath diversity. Space diversity may be achieved by using multiple transmit or receive antennas. The spatial separation between the multiple antennas is chosen so that the diversity branches experience fading with little or no correlation. Transmit diversity uses multiple transmit antennas in order to provide the receiver with multiple uncorrelated replicas of the same signal. Transmit diversity schemes may further be divided into open loop transmit diversity and closed-loop transmit diversity schemes. In an open loop transmit diversity approach, no feedback is required from the receiver. In a known arrangement of a closed loop transmit diversity, the receiver computes the phase and amplitude adjustment that should be applied at the transmitter antennas to maximize the received signal power at the receiver. In another arrangement of the closed loop transmit diversity referred to as selection transmit diversity (STD), the receiver provides feedback information to the transmitter on antenna (s) to be used for transmission.

Dynamic Category 0 (Cat 0) bits are a LTE terminology used in 3GPP LTE standard body. The role of Cat0 is to support dimensioning (scaling) of the downlink control channel by indicating the number of downlink and uplink scheduling grants. The current working assumption in reference [1] is that the dynamic Cat0 bits have a maximum size of two bits, and the dynamic Cat0 bits should be transmitted once during every subframe where a control channel element (CCE) is present. The information conveyed by Cat0 bits includes, but not limited to, the number of OFDM symbols used for all control channels in the subframe. The transmit diversity of the Cat0 bits is not finalized, and it is the objective of the present invention to provide a simple and efficient transmit diversity scheme that captures both spatial and frequency diversity in the channel. In reference [3], several approaches of coding and transmit diversity have been described for both the Category 0 bits and ACK/NACK channels. In the 3GPP standard RAN1 meeting in May 2007, the Category 0 bits have been renamed as CCFI (Control Channel Format Indicator). In the present invention, one additional coding method is proposed, as well as frequency domain resource mapping methods for the transmission of CCFI channel.

In addition, it was proposed in reference [3] to use a (3,2,2) binary linear code to map the 2 Cat0 bits into a 3-bit codeword $c_1c_2c_3$, and this codeword belongs to a codebook of size four with a minimum Hamming distance two between any pairs of codewords. One example of the (3,2) codebook in reference [3] is $c_1c_2c_3 \in C_1=\{111, 100, 010\ 001\}$.

Because the size of (3,2) codebook as above presented is three, merely repeating the 3-bit codeword may only be suitable for a case where the length of a coded CCFI is an integer multiple of three. Therefore, it is important to provide a CCFI coding method in a case where the length of a coded CCFI is not an integer multiple of three.

SUMMARY OF THE INVENTION

It is therefore one object of the present invention to provide an improved process and apparatus for solving the above mentioned problems.

It is another object of the present invention to provide a CCFI coding method in a case where the length of a coded CCFI is not an integer multiple of three.

In one embodiment of the present invention, it is proposed to code the CCFI channel using a concatenation of repeated (3,2) codewords and uncoded CCFI bits, for the case where the total codeword length is not an integer multiple of three. Because the size of the (3,2) codebook as above presented is three and thus it is important to provide a CCFI coding method in a case where the length of a coded CCFI is not an integer multiple of three.

As shown in the table below, a mapping between the two bits CCFI and the component codewords in a (3,2) codebook is established.

| CCFI bits $b_1 b_2$ | Component codeword $c_1 c_2 c_3$ (assuming (3, 2) codebook $C_2$) | Component codeword $c_1 c_2 c_3$ (assuming (3, 2) codebook $C_1$) |
| --- | --- | --- |
| 00 | 000 | 111 |
| 01 | 011 | 100 |
| 10 | 101 | 010 |
| 11 | 110 | 001 |

The length-32 codewords are generated in the following procedures.
(1) A length-3 component codeword $c_1 c_2 c_3$ is generated as shown in Table above;
(2) the component codeword $c_1 c_2 c_3$ is repeated ten times to generate a length-30 sequence; and
(3) the length-30 sequence is concatenated with the original CCFI bits $b_1 b_2$.

The resulting four codewords of codebook A corresponding to each codeword of codebook $C_2$ are:

| Codebook A |
| --- |
| 000 000 000 000 000 000 000 000 000 000 00 (cw 1) |
| 011 011 011 011 011 011 011 011 011 011 01 (cw 2) |
| 101 101 101 101 101 101 101 101 101 101 10 (cw 3) |
| 110 110 110 110 110 110 110 110 110 110 11 (cw 4) |

In another embodiment of the current invention, when the CCFI has only three states (i.e., CCFI is any three of "00", "01", "10" and "11"), then any of the three codewords in the above set may be used to carry the CCFI information.

In another embodiment of the present invention, the codebook generated above is column-wise permuted in order to fit the K 1×2 RU resource configuration, which has a total of 4K coded bits. In this permutation method, based on the sequential concatenation of the repeated codewords, K repetitions of 3-bit component codeword are assigned to the K RUs (leaving one bit open at each RU), and then the remaining K bits are mapped separately to the K RUs. Other codewords of codebook A may deviate in the same method. The resulting codebook deviated from codebook A is called Codebook B as shown below. The codebook B may be better than codebook A in fading channels, since a fill repetition to an RU is mapped as much as possible.

| Codebook B |
| --- |
| 0000 0000 0000 0000 0000 0000 0000 0000 (cw 1) |
| 0110 0111 0111 0110 0111 0111 0110 0111 (cw 2) |
| 1011 1010 1011 1011 1010 1011 1011 1010 (cw 3) |
| 1101 1101 1100 1101 1101 1100 1101 1101 (cw 4) |

In another embodiment of the current invention, a variation of the codebook A may obtained by mapping the CCFI bits to codebook C1, instead of codebook C2. The same repetition and concatenation used in generating this new codebook, called codebook C.

| Codebook C |
| --- |
| 111 111 111 111 111 111 111 111 111 111 00 (cw 1) |
| 100 100 100 100 100 100 100 100 100 100 01 (cw 2) |
| 010 010 010 010 010 010 010 010 010 010 10 (cw 3) |
| 001 001 001 001 001 001 001 001 001 001 11 (cw 4) |

In another embodiment of the current invention, same column-wise permutation as stated above is applied to Codebook C in order to generate Codebook D.

| Codebook D |
| --- |
| 1111 1111 1111 1111 1111 1111 1110 1110 (cw 1) |
| 1001 1000 1000 1001 1000 1000 1000 1001 (cw 2) |
| 0100 0101 0100 0100 0101 0100 0101 0100 (cw 3) |
| 0010 0010 0011 0010 0010 0011 0011 0011 (cw 4) |

In another embodiment of the current invention, when the CCFI has only three states, any three codewords in a given codebook (e.g., Codebook A, B, C, D, etc) may be used to carry the CCFI information.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Three references of the present invention are listed as below.

[1]. 3GPP RAN WG1#48bis Chairman's Notes, March 2007, Malta

[2]. R1-050271, "Evaluation of Diversity in Evolved UTRA", Samsung, RAN1#40bis, Beijing China, April 2005

[3]. "Transmit Diversity for Acknowledgement and Category 0 bits in a Wireless communication System", earlier filed provisional in the U.S. Patent & Trademark Office on 26 Apr. 2007 and there duly assigned Ser. No. 60/924,020 and earlier filed provisional in the U.S. Patent & Trademark Office on 9 May, 2007 and there duly assigned Ser. No. 60/924,339.

In reference [3], several approaches of coding and transmit diversity are described for both the Category 0 bits and ACK/NACK channels. In the 3GPP standard RAN1 meeting in May 2007, the Category 0 bits have been renamed as CCFI (Control Channel Format Indicator). In the practice of the principle of the present invention, a few additional coding methods as well as frequency domain resource mapping methods for the transmission of CCFI channel are disclosed. Here, the CCFI is also known as PCFICH (Physical Control Format Indicator Channel).

Figure 1:
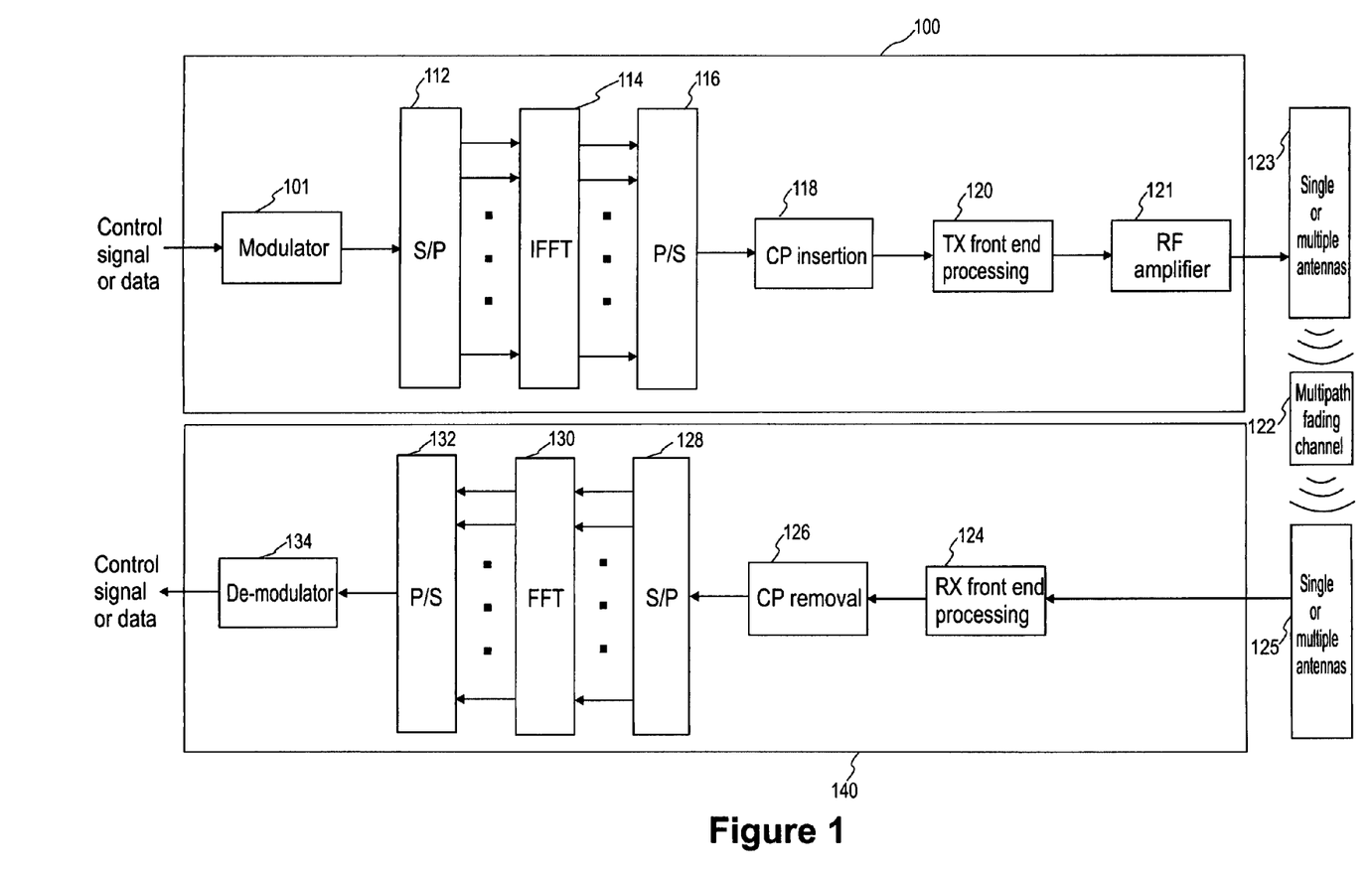
FIG. 1 is an illustration of an Orthogonal Frequency Division Multiplexing (OFDM) transceiver chain having transmitter chain and receiver chain.

Orthogonal Frequency Division Multiplexing (OFDM) is a technology to multiplex data in frequency domain. Modulation symbols are carried on frequency sub-carriers. FIG. 1 illustrate of an Orthogonal Frequency Division Multiplexing (OFDM) transceiver chain having a transmitter chain and a receiver chain. A sample of Orthogonal Frequency Division Multiplexing (OFDM) transceiver chain is shown in FIG. 1. At a transmitter chain 100, control signals or data signals are modulated by a modulator 101 and and the modulated signals are serial-to-parallel converted by a serial-to-parallel convertor 112. An Inverse Fast Fourier Transform (IFFT) unit 114 is used to transfer the modulated signal or data from frequency domain to time domain, and the modulated signals trasferred to the time domain is parallel-to-serial converted by a parallel-to-serial convertor 116. A cyclic prefix (CP) or zero prefix (ZP) is added to each OFDM symbol at a CP insertion stage 118 to avoid or alternatively, to mitigate the impact due to multipath fading at a multipath fading channel 122. Signals from cyclic prefix (CP) insertion stage 118 are applied to transmitter front end processing unit 120, RF amplifier 121 and then single or multiple antennas 123. Therefore, the signals transmitted by transmitter chain 100 are received by receiver chain 140. At a receiver chain 140, assuming that perfect time and frequency synchronization are achieved, signals received by receiving single or multiple antennas 125 is applied to receiver front end processing unit 124, are processed at a cyclic prefix (CP) removal stage 126 which removes the cyclic prefix (CP) of the received signal. Signals processed in cyclic prefix (CP) removal stage 126 are further serial-to-parallel converted by a serial-to-parallel convertor 128. A Fast Fourier Transform (FFT) unit 130 transfers the received signals from the time domain to the frequency domain for further processing, including parallel-to-serial conversion by a parallel-to-serial convertor 132 and being demodulation by signal de-modulator 134.

The total bandwidth in an OFDM system is divided into narrowband frequency units called subcarriers. The number of subcarriers is equal to the FFT/IFFT size N used in the system. In general, the number of subcarriers used for data is less than N because some of the subcarriers located at the edge of the frequency spectrum are reserved as guard subcarriers. As a general rule, no information may be transmitted on guard subcarriers.

A typical cellular radio system includes a collection of fixed base stations (BS) that define a radio coverage area or a cell. Typically, a non-line-of-sight (NLOS) radio propagation path exists between a base station and a mobile station due to natural and man-made objects that are situated between the base station and the mobile station. As a consequence, the radio waves propagate via reflections, diffractions and scattering. The arriving waves at the mobile station (MS) in the downlink direction (at the BS in the uplink direction) experience constructive and destructive additions because of different phases of the individual waves. This is due the fact that, at the high carrier frequencies typically used in the cellular wireless communication, small changes in the differential propagation delays introduce large changes in the phases of the individual waves. Additionally, when the MS is moving or changes occur in the scattering environment, the spatial variations in the amplitude and phase of the composite received signal will manifest themselves as the time variations known as Rayleigh fading or fast fading. The time-varying nature of the wireless channel requires very high signal-to-noise ratio (SNR) in order to provide desired bit error or packet error reliability.

Diversity is widely used to combat the effects of fast fading. The idea is to provide the receiver with multiple faded replicas of the same information-bearing signal. On the assumption of independent fading of the signals broadcast by each of the antenna branches, the probability, that the instantaneous SNR is below a certain threshold on each branch is approximately $p^L$, where p is the probability that the instantaneous SNR is below the certain threshold on each antenna branch. L is the number of antenna branches. From a system operation viewpoint, "antenna branch" is also known as "antenna ports", and it indicates the number of antennas at the base station.

The methods of diversity that are suitable for use fall into the following categories: space, angle, polarization, field, frequency, time and multipath diversity. Space diversity may be achieved by using multiple transmit or receive antennas. The spatial separation between the multiple antennas is chosen so that the diversity branches experience fading with little or no correlation of the signals during the transit between the transmitting and receiving antennas. Transmit diversity uses multiple transmitting antennas in order to provide the receiver with multiple uncorrelated replicas of the same signal. Transmit diversity schemes may further be divided into open loop transmit diversity and closed-loop transmit diversity schemes. In an open loop transmit diversity approach, no feedback is required from the receiver. In one known arrangement of a closed loop transmit diversity, the receiver computes the phase and amplitude adjustment that should be applied at the transmitter antennas to maximize the received signal power at the receiver. In another arrangement of the closed loop transmit diversity referred to as selection transmit diversity (STD), the receiver provides feedback information to the transmitter on antenna(s) to be used for transmission.

Figure 2:
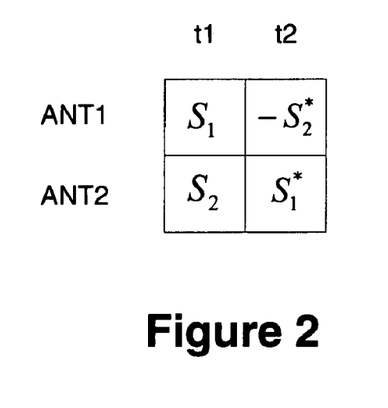
FIG. 2 shows an Alamouti 2×1 space-time diversity scheme.

An example of open-loop transmit diversity scheme is the Alamouti 2×1 space-time diversity scheme. FIG. 2 shows an Alamouti 2×1 space-time diversity scheme. In this approach during any symbol period, two data symbols are transmitted simultaneously from the two transmit antennas ANT1 and ANT2. Suppose during the first symbol interval t1, the symbols transmitted from ANT1 and ANT2 are denoted as $S_1$ and $S_2$ respectively as shown in FIG. 2. During the next symbol period, the symbols transmitted from ANT1 and ANT2 are— $S_2^*$ and $S_1^*$ respectively where $x^*$ represents the complex conjugate of x. With certain processing at the receiver, original symbols $S_1$ and $S_2$ may be recovered. Here, the instantaneous channel gain estimates h1 and h2 on ANT1 and ANT2, respectively, are required for faithful recovery at the receiver. This requires separate pilot symbols on both of the antennas in order to provide channel gain estimation at the receiver. The diversity gain achieved by Alamouti coding is the same as that which may be achieved in Maximum Ratio Combining (MRC).

Figure 3:
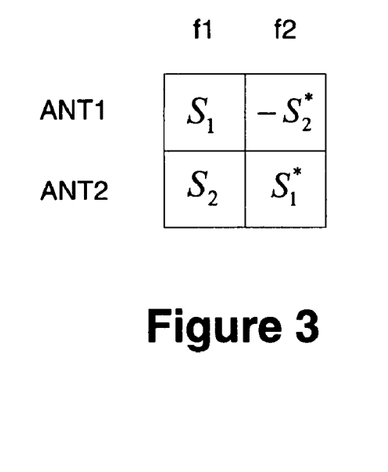
FIG. 3 shows an Alamouti 2×1 space-frequency scheme.

A 2×1 Alamouti scheme may also be implemented in a space-frequency coded form. FIG. 3 shows a 2×1 Alamouti scheme implemented in a space-frequency coded form. In this case, the two symbols are sent on two different frequencies, i.e., subcarriers f1 and f2, for example, on different subcarriers in an Orthogonal Frequency Division Multiplexing (OFDM) system as shown in FIG. 3. When implemented in a space-frequency coded form in the open-loop transmit diversity scheme, the 2×1 Alamouti space-frequency diversity scheme illustrated by FIG. 3 shows an Alamouti 2×1 space-frequency diversity scheme in which during any symbol period, two data symbols are transmitted simultaneously from the two transmit antennas ANT1 and ANT2. If during the first frequency f1, the symbols transmitted from ANT1 and ANT2 are denoted as $S_1$ and $S_2$ respectively as shown in FIG. 3. During the next symbol period, the symbols transmitted from ANT1 and ANT2 are—$S_2^*$ and $S_1^*$ respectively where x* represents the complex conjugate of x. Original symbols $S_1$ and $S_2$ may be recovered by the receiver. Here, the instantaneous channel gain estimates h1 and h2 on ANT 1 and ANT 2, respectively, are required for faithful recovery at the receiver. This requires separate pilot symbols on both of the antennas in order to provide channel gain estimation at the receiver. The diversity gain achieved by Alamouti coding is the same as that which may be achieved in Maximum Ratio Combining (MRC).

The received signals $r_1$ and $r_2$ at the mobile station in subcarrier f1, r1, and in subcarrier f2, r2, may be written as:

$$r_1 = h_1 s_1 + h_2 s_2 + n_1$$
$$r_2 = -h_1 s_2^* + h_2 s_1^* + n_2 \quad (1)$$

where h1 and h2 are channel gains from ANT1 and ANT2 respectively. The assumption here is that the channel from a given antenna does not change between subcarriers f1 and f2. The mobile station performs equalization on the received signals and combines the two received signals (r1 and r2) in order to recover the symbols S1 and S2.

$$\hat{s}_1 = h_1^* r_1 + h_2 r_2^* \quad (2)$$
$$= h_1^*(h_1 s_1 + h_2 s_2 + n_1) + h_2(-h_1 s_2^* + h_2 s_1^* + n_2)^*$$
$$= (|h_1|^2 + |h_2|^2) s_1 + h_1^* n_1 + h_2 n_2^*$$
$$\hat{s}_2 = h_2^* r_1 + h_1 r_2^*$$
$$= h_2^*(h_1 s_1 + h_2 s_2 + n_1) + h_1(-h_1 s_2^* + h_2 s_1^* + n_2)^*$$
$$= (|h_1|^2 + |h_2|^2) s_2 + h_2^* n_1 + h_1 n_2^*$$

It may be seen that both the transmitted symbols S1 and S2 achieve full spatial diversity.

The term Dynamic Category 0 (Cat 0) bits is a LTE terminology used by the 3GPP LTE standard body. The role of Cat0 is to support dimensioning (scaling) of the downlink control channel by indicating the number of downlink and uplink scheduling grants. The current working assumption in reference [1] is that the dynamic Cat0 bits have a maximum size of two bits, and should be transmitted during every subframe where a control channel element (CCE) is present. The information conveyed by Cat0 bits includes, but is not limited to, the number of OFDM symbols used for all control channels in the subframe. The transmit diversity of the Cat0 bits is not finalized, and it is one of the objectives of the present invention to provide a simple and efficient transmission and reception diversity scheme that is enable to capture both spatial and frequency diversity in the channel. In reference [3], several approaches of coding and transmit diversity have been described for both the Category 0 bits and ACK/NACK channels. In the 3GPP standard RAN1 meeting in May 2007, the Category 0 bits have been renamed as CCFI (Control Channel Format Indicator). In the present invention, one additional coding method is proposed, as well as frequency domain resource mapping methods for the transmission of CCFI channel.

In addition, it was proposed in reference [3] to use a (3,2,2) binary linear code to map the two Cat0 bits into a 3-bit codeword $c_1 c_2 c_3$, and to assign this codeword belongs to a codebook of size four with a minimum Hamming distance two between any pairs of codewords. A linear code (n,k,d) means a code with each codeword length of n coded bits, and each codeword correspond to a message with length k information bits. The minimum hamming distance of the codebook is d. Once the 3-bit codeword is specified, it will be repeated and rate-matched to fit the 2K channel symbols that are going to be used for the Cat0 bits. A (3,2) codebook is a short-hand notation of (3,2,2) code. One example of the (3,2) codebook in reference [3] is $c_1 c_2 c_3 \in C_1 = \{111, 100, 010\,001\}$.

In one embodiment of the present invention, it is proposed to code the CCFI channel using a concatenation of repeated (3,2) codewords and uncoded CCFI bits, for the case where the total codeword length is not an integer multiple of three. Because the size of (3,2) codebook as above presented is three and thus it is important to provide a CCFI coding method in a case where the length of a coded CCFI is not an integer multiple of three.

For example, when a total number of K 1×2 resource units (RU) are assigned to the CCFI channel, there are 2K channel symbols and 4K channel bits, assuming QPSK modulation on each channel symbol. Here, 1×2 RU occupies one OFDM symbol and two neighboring subcarriers. For example, when K=8 RUs, there are 2K=16 channel symbols and 32 coded bits. 32 is not an integer multiple of three.

As shown in Table 1, a mapping between the 2 bits CCFI and the component codewords in a (3,2) codebook is established. Table 1 is a mapping between CCFI bits and component codewords as shown above. Here, the (3,2) codebook is $c_1 c_2 c_3 \in C_2 = \{000, 011, 101, 101\}$. Note the above shown (3,2) codebook is equivalent to $c_1 c_2 c_3 \in C_1 = \{111, 100, 010\,001\}$. CCFI bits $b_1$ and $b_2$ are original CCFI bits. Component codewords of two (3,2) codebooks $C_1$ and $C_2$ corresponding to each state of CCFI bits are shown in Table 1.

TABLE 1

Mapping between CCFI bits and component codewords.

| CCFI bits $b_1 b_2$ | Component codeword $c_1 c_2 c_3$ (assuming (3, 2) codebook $C_2$) | Component codeword $c_1 c_2 c_3$ (assuming (3, 2) codebook $C_1$) |
|---|---|---|
| 00 | 000 | 111 |
| 01 | 011 | 100 |
| 10 | 101 | 010 |
| 11 | 110 | 001 |

Four codewords with length of 32 generated for the CCFI bits $b_1 b_2$ are shown as follows, for the example above. Here, (3,2) codebook $C_2$ are used. The length-32 codewords are generated by modulator 101 with the following procedural steps.

(1) A length-3 component codeword $c_1c_2c_3$ is generated as shown in Table 1;
(2) the component codeword $c_1c_2c_3$ is repeated ten times to generate a length 30 sequence; and
(3) the length-30 sequence is concatenated with the original CCFI bits $b_1b_2$.

Here, the codeword $c_1c_2c_3$ is repeated $\lfloor 4K/3 \rfloor$ times, and the resulting sequence is concatenated with the original CCFI bits $b_1b_2$. This concatenated bit sequence is the final channel bit sequence to be modulated and mapped into channel symbol.

The resulting four codewords of codebook A corresponding to each codeword of codebook $C_2$ are:

| Codebook A |
| --- |
| 000 000 000 000 000 000 000 000 000 000 00 (cw 1) |
| 011 011 011 011 011 011 011 011 011 011 01 (cw 2) |
| 101 101 101 101 101 101 101 101 101 101 10 (cw 3) |
| 110 110 110 110 110 110 110 110 110 110 11 (cw 4) |

In another embodiment of the current invention, if the CCFI has only three states (i.e., CCFI is any three of "00", "01", "10" and "11"), then any of the 3 codewords in the above set may be used to carry the CCFI information.

Figure 4:
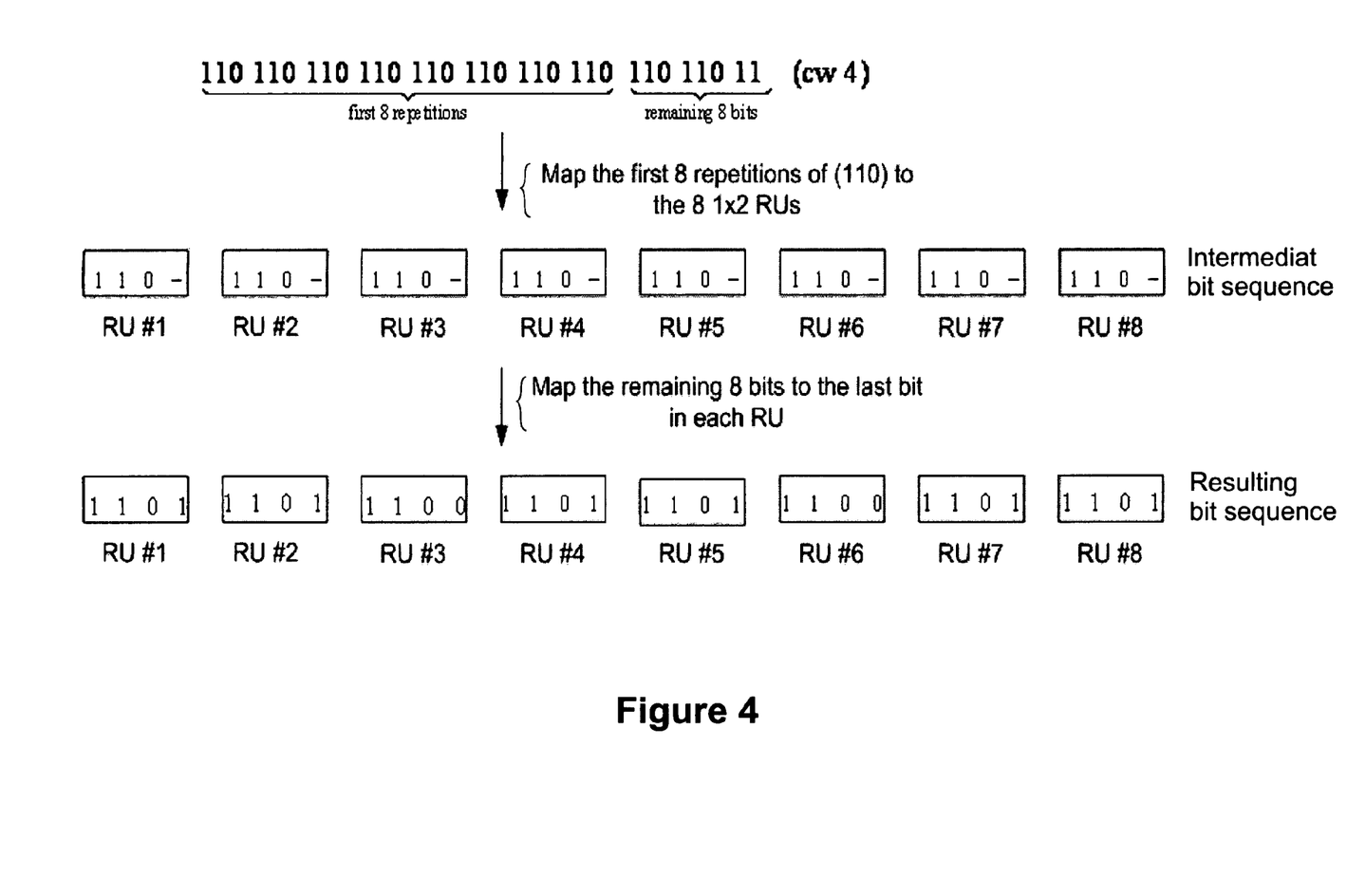
FIG. 4 shows an example of a method of a column-wise permutation.

In another embodiment of the present invention, the codebook generated above is column-wise permuted to fit the K 1×2 RU resource configuration, which has a total of 4K coded bits. FIG. 4 shows an example of a method of a column-wise permutation. In this permutation method, based on the sequential concatenation of the repeated codewords, K repetitions of 3-bit component codeword are assigned to the K RUs (leaving one bit open at each RU), and then the remaining K bits are mapped separately to the K RUs. The permutation of CW4 is illustrated in FIG. 4. Other codewords of codebook A may be deviated in the same method. The resulting codebook deviated from codebook A is called Codebook B as shown below. The codebook B may be better than codebook A in fading channels, since a full repetition to an RU is mapped as much as possible.

| Codebook B |
| --- |
| 0000 0000 0000 0000 0000 0000 0000 0000 (cw 1) |
| 0110 0111 0111 0110 0111 0111 0110 0111 (cw 2) |
| 1011 1010 1011 1011 1010 1011 1011 1010 (cw 3) |
| 1101 1101 1100 1101 1101 1100 1101 1101 (cw 4) |

In another embodiment of the current invention, a variation of the codebook A may obtained by mapping the CCFI bits to codebook C1, instead of codebook C2, as shown in Table 1. The same repetition and concatenation used in generating this new codebook, called codebook C.

| Codebook C |
| --- |
| 111 111 111 111 111 111 111 111 111 111 00 (cw 1) |
| 100 100 100 100 100 100 100 100 100 100 01 (cw 2) |
| 010 010 010 010 010 010 010 010 010 010 10 (cw 3) |
| 001 001 001 001 001 001 001 001 001 001 11 (cw 4) |

In another embodiment of the current invention, same column-wise permutation as shown in FIG. 4 is applied to Codebook C and Codebook D is obtained.

| Codebook D |
| --- |
| 1111 1111 1111 1111 1111 1111 1110 1110 (cw 1) |
| 1001 1000 1000 1001 1000 1000 1000 1001 (cw 2) |
| 0100 0101 0100 0100 0101 0100 0101 0100 (cw 3) |
| 0010 0010 0011 0010 0010 0011 0011 0011 (cw 4) |

In another embodiment of the current invention, when the CCFI has only three states, any three codewords in a given codebook (e.g, Codebook A, B, C, D, etc) may be used to carry the CCFI information.

Figure 5A:
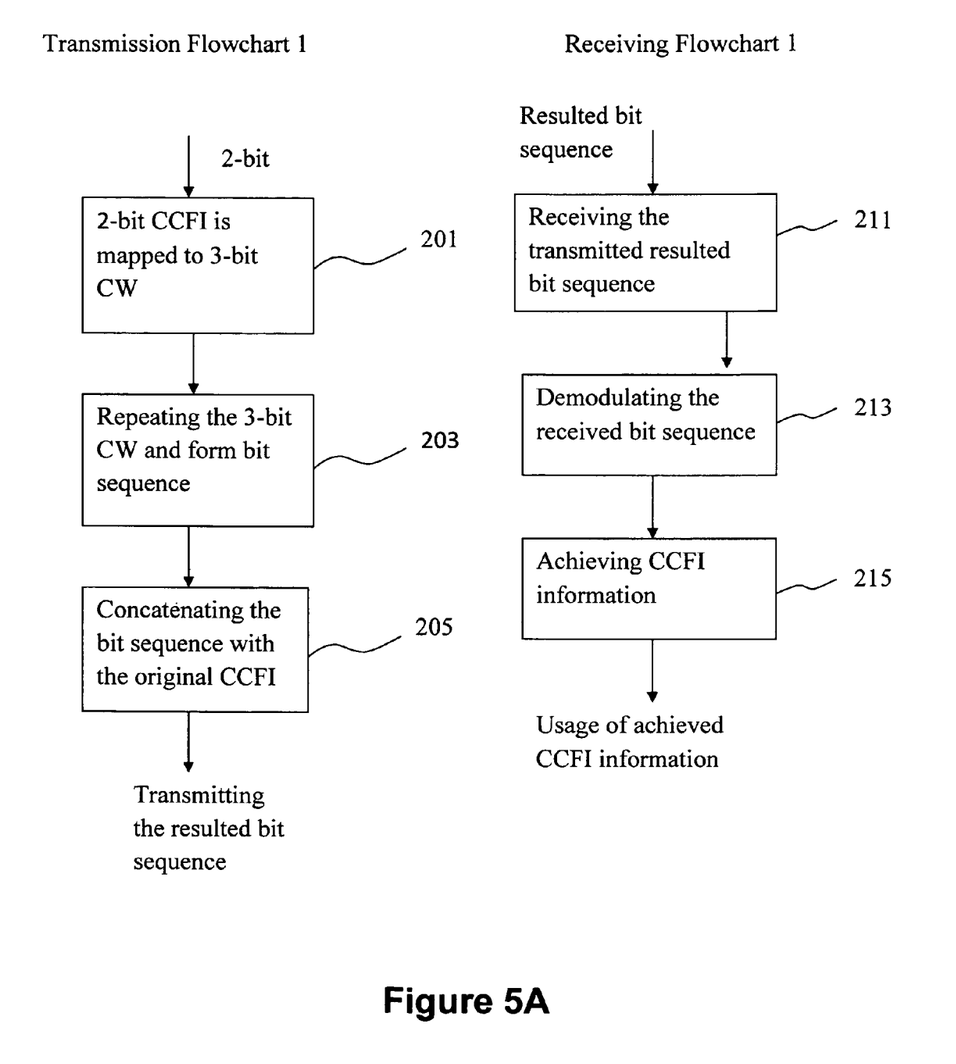
FIGS. 5A and 5B are flowcharts illustrating procedural steps of transmitting and receiving CCFI according to different embodiments of the present invention.
Figure 5B:
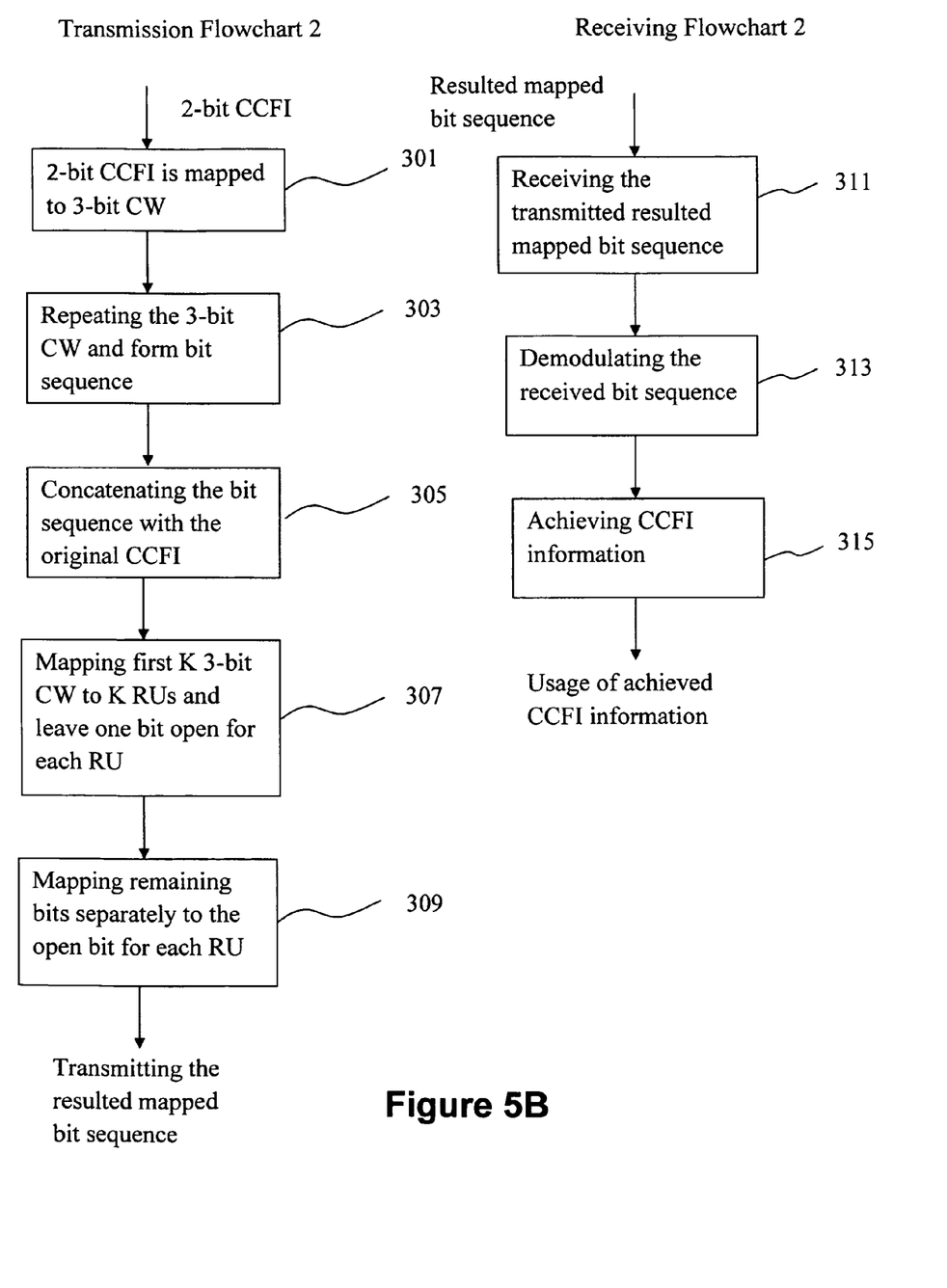

FIGS. 5A and 5B are flowcharts illustrating procedural steps of transmitting and receiving CCFI according to different embodiments of the present invention.

In FIG. 5A, the procedure of generating Codebooks A and C are presented. When the CCFI is transmitted at a transmitter, two-bit CCFI is mapped to 3-bit codeword of codebook C1 or C2 as shown in Table 1 at step 201, the three-bit codeword is repeated for a predetermined times with the number of the predetermined time being a flooring of quotient $\lfloor 4K/3 \rfloor$, where K is the number of resource units at step 203, the resulting bit sequence is concatenated with the original CCFI bits at step 205 and thus a final bit sequence is generated and transmitted at transmitting antennas. At the receiver side, the receiving antennas receive the transmitted resulting bit sequence from the transmitter at step 211, a demodulator of the receiver demodulates the received bit sequence at step 213, and the receiver achieves the information carried by CCFI at step 215 and thus the achieved information carried by the CCFI is utilized by the receiver.

In FIG. 5B, the procedure of generating Codebooks B and D are presented. When the CCFI is transmitted at a transmitter, two-bit CCFI is mapped to three-bit codeword of codebook C1 or C2 as shown in Table 1 at step 301, the three-bit codeword is repeated for a predetermined times with the number of the predetermined time being a quotient of 4K/3 where K is the number of resource units at step 303, the resulting bit sequence is concatenated with the original CCFI bits at step 305 and thus a bit sequence is generated. Here, the bit sequence may be illustrated as cw 4 shown in FIG. 4. At step 307, leading K repetitions of the three-bit codeword as shown in Table 1 in the resulting bit sequence is mapped to the number of K resource units respectively with one bit of each of resource units being open, and the remaining K bits of the bit sequence are separately mapped to the open bit of each of the number of K resource units at step 309. Step 307 may be illustrated as the intermediate RU#1-RU#8 each having one bit open as shown in the intermediate bit sequence shown in FIG. 4. Step 309 may be illustrated as the final RU#1-RU#8 each having four bits allocated as shown by the resulting bit sequence shown in FIG. 4. The resulting mapped bit sequences are transmitted by the transmitting antennas. At the receiver side, the receiving antennas receive the transmitted resulting bit sequence from the transmitter at step 311, a demodulator of the receiver demodulates the received bit sequence at step 313, and the receiver achieves the information carried by CCFI at step 315 and thus the achieved information carried by the CCFI is utilized by the receiver.

Modulator 101 and IFFT 114 of transmitter 100 include microprocessors based controller. Demodulator 134 and FFT 130 of receiver 140 include microprocessors based controller.

What is claimed is:
1. A method of operating a base station, the method comprising:

mapping a plurality of two-bit CCFI (Control Channel Format Indicator) into one selected from a first codebook and a second codebook, with the plurality of CCFI being selected from a group consisting of "00 ", "01", "10" and "11" , and with the first codebook comprising codewords selected from a group consisting of component codewords "000", "011", "101" and "110" corresponding to a designated CCFI and the second codebook comprising codewords selected from a component codeword group consisting of component codewords "111", "100", "010" and "001" corresponding to the designated CCFI;

generating a sequence of codewords selected from either the first codebook or the second codebook by repeating the selected component codeword for predetermined times, with the predetermined times being determined by a flooring of quotient [4K/3],where K is a number of resource units occupying one Orthogonal Frequency Division Multiplexing (OFDM) symbol and two neighboring subcarriers;

generating a codeword by concatenating the sequence of the selected component codewords with the original designated CCFI bits; and transmitting the codeword carrying information of CCFI by the base station.

2. The method of claim 1, when CCFI has four states consisting "00", "01", "10" and "11", further comprising generating a third codebook comprising four codewords by concatenating the sequence of the component codewords selected from the first codebook with the designated CCFI to which the selected component codeword corresponds and the four codewords being "000 000 000 000 000 000 000 000 000 00", "011 011 011 011 011 011 011 011 011 011 01", "101 101 101 101 101 101 101 101 101 101 10" and "110 110 110 110 110 110 110 110 110 110 11" with the four codewords being corresponding the designated CCFI.

3. The method of claim 1, when CCFI has three states selected from the group consisting of "00", "01", "10" and "11", further comprising generating the third codebook comprising three codewords by concatenating the sequence of component codewords selected from the first codebook with the designated CCFI to which the selected component codeword corresponds and the three codewords being selected from a group consisting of "000 000 000 000 000 000 000 000 000 000 00", "011 011 011 011 011 011 011 011 011 011 011", "101 101 101 101 101 101 101 101 101 101 10" and "110 110 110 110 110 110 110 110 110 110 11" with the three codewords being corresponding the designated CCFI.

4. The method of claim 2, when CCFI has four states consisting "00", "01", "10" and "11", further comprising generating a fourth codebook comprising four codewords by concatenating the sequence of component codewords selected from the second codebook with the designated CCFI to which the selected component codeword corresponds and the four codewords being "111 111 111 111 111 111 111 111 111 111 00", "100 100 100 100 100 100 100 100 100 100 01", "010 010 010 010 010 010 010 010 010 010 10" and "001 001 001 001 001 001 001 001 001 001 11" with the four code words being corresponding the designated CCFI.

5. The method of claim 3, when CCFI has three states selected from the group consisting of "00", "01", "10" and "11", further comprising generating the fourth codebook comprising three codewords by concatenating the sequence of component codewords selected from the second codebook with the designated CCFI to which the selected component codeword corresponds and the three codewords being selected from a group consisting of "111 111 111 111 111 111 111 111 111 111 00", "100 100 100 100 100 100 100 100 100 100 01", "010 010 010 010 010 010 010 010 010 010 10" and "001 001 001 001 001 001 001 001 001 001 11" with the three codewords being corresponding the designated CCFI.

6. The method of claim 2, when CCFI has four states consisting "00", "01", "10" and "11", further comprising generating a permutation of each of the four codewords by mapping a leading K repetitions of a three-bit component codeword in the four codewords to the number of K resource units respectively with one bit of each of resource units being open and mapping remaining K bits of each of the four codewords separately to the open bit of each of the number of K resource units.

7. The method of claim 4, when CCFI has four states consisting "00", "01", "10" and "11", further comprising generating a fifth codebook having four codewords and the four codewords being "0000 0000 0000 0000 0000 0000 0000 0000", "0110 0110 0110 0110 0110 0110 0110 0110","1011 1011 1011 1011 1011 1011 1011 1011"and "1101 1101 1101 1101 1101 1101 1101 1101" with the four codewords being corresponding the designated CCFI.

8. The method of claim 4, when CCFI has four states consisting "00", "01", "10" and "11", further comprising generating a permutation of each of the four codewords by mapping a leading K repetitions of a three-bit component codeword in the four codewords to the number of K resource units respectively with one bit of each of resource units being open and mapping the remaining K bits of each of the four codewords separately to the open bit of each of the number of K resource units.

9. The method of claim 8, when CCFI has four states consisting "00", "01", "10" and "11", further comprising generating a sixth codebook having four codewords and the four codewords being "1111 1111 1111 1111 1111 1111 1111 1111", "1001 1001 1001 1001 1001 1001 1001 1001", "0100 0100 0100 0100 0100 0100 0100 0100" and "0010 0010 0010 0010 0010 0010 0010 0010" with the four codewords being corresponding the designated CCFI.

10. The method of claim 5, when CCFI has three states selected from the group consisting of "00", "01", "10" and "11", further comprising generating a fifth codebook having three codewords and the three codewords being selected from "0000 0000 0000 0000 0000 0000 0000 0000","0110 0110 0110 0110 0110 0110 0110 0110","1011 1011 1011 1011 1011 1011 1011 1011" and "1101 1101 1101 1101 1101 1101 1101 1101" with the three codewords being corresponding the designated CCFI.

11. The method of claim 9, when CCFI has three states selected from the group consisting of "00", "01", "10" and "11", further comprising generating the sixth codebook having three codewords and the three codewords being selected from "1111 1111 1111 1111 1111 1111 1111 1111", "1001 1001 1001 1001 1001 1001 1001 1001", "0100 0100 0100 0100 0100 0100 0100 0100" and "0010 0010 0010 0010 0010, 0010 0010" with the three codewords being corresponding the designated CCFI.

12. An apparatus, comprising:
a coder configured to map a plurality of two-bit CCFI (Control Channel Format Indicator), into one selected from a first codebook and a second codebook, with the plurality of CCFI being selected from a group consisting of "00", "01", "10" and "11" ,and with the first codebook comprising codewords selected from a group consisting of component codewords "000", "011", "101" and "110" corresponding to a designated CCFI and the second codebook comprising codewords selected from a component codeword group consisting of component codewords "111", "100", "010" and "001" corresponding to the designated CCFI; generate a sequence of codewords selected from either the first codebook or the second codebook by repeating the selected component codeword for predetermined times, with the predetermined times being determined by a flooring of quotient [4K/3], where K is a number of resource units occupying one Orthogonal Frequency Division Multiplexing (OFDM) symbol and two neighboring subcarriers; and generate a codeword by concatenating the sequence of the selected component codewords with the original designated CCFI bits; and an RF amplifier configured to enable transmission of the codeword carrying information of CCFI.

13. A method for receiving a control channel format, the method comprising:

receiving a control channel format indicator (CCFI) codeword;

decoding the received CCFI codeword to identify a CCFI corresponding to the received CCFI codeword, the CCFI being associated with the number of orthogonal frequency division multiplexing (OFDM) symbols used for transmission of control channels in a subframe; and receiving control data using the identified CCFI, wherein the identified CCFI is one of at least a first index, a second index, and a third index, and wherein the CCFI codeword was coded by a transmitter by mapping the identified CCFI to the CCFI codeword using a codebook that comprises at least "011011011011011011011011101101101101", "101101101101101101101101101101101110110" and "110110110110110110110110110110111011011".

14. The method of claim 13, further comprising receiving modulation symbols modulated by QPSK modulation; and demodulating the modulation symbols to obtain the CCFI codeword.

15. The method of claim 13, wherein CCFI is one of at least "01", "10" and "11" corresponding to "011011011011011011011011101101101101", "101101101101101101101101101101101110110" and "110110110110110110110110110110111011011", respectively.

16. A method for transmitting a control channel format, the method comprising:

determining, by a base station, a control channel format indicator (CCFI), the CCFI being associated with a number of orthogonal frequency division multiplexing (OFDM) symbols used for transmission of control channels in a subframe;

coding the CCFI to a CCFI codeword;

transmitting the CCFI codeword and control data to one or more subscriber stations based on the CCFI; and wherein the CCFI is one of at least "01", "10", "and "11", and wherein the CCFI codeword is selected from a codebook for mapping the CCFI to the CCFI codeword, the codebook comprising at least "011011011011011011011011101101101101", "101101101101101101101101101101101110110" and "110110110110110110110110110110111011011".

17. The method of claim 16, wherein CCFI is one of at least "01", "10" and "11" corresponding to "011011011011011011011011101101101101", "101101101101101101101101101101101110110" and "110110110110110110110110110110111011011", respectively.

18. An apparatus comprising:

a receiver configured to receive a control channel format indicator (CCFI) codeword, decode the received CCFI codeword to identify a CCFI corresponding to the received CCFI codeword, the CCFI being associated with the number of orthogonal frequency division multiplexing (OFDM) symbols used for transmission of control channels in a subframe, and receive control data using the identified CCFI; and an antenna configured enable reception of the CCFI codeword and the control data, wherein the identified CCFI is one of at least a first index, a second index, and a third index, and wherein the CCFI codeword was coded by a transmitter by mapping the identified CCFI to the CCFI codeword using a codebook that comprises at least "011011011011011011011011101101101101", "101101101101101101101101101101101110110" and "110110110110110110110110110110111011011".

19. The apparatus of claim 18, wherein the receiver is further configured to receive modulation symbols modulated by QPSK modulation and demodulate the modulation symbols to obtain the CCFI codeword.

20. The apparatus of claim 18, wherein CCFI is one of at least "01", "10" and "11" corresponding to "011011011011011011011011101101101101", "101101101101101101101101101101101110110" and "110110110110110110110110110110111011011", respectively.

21. An apparatus comprising:

a coder configured to determine a control channel format indicator (CCFI), the CCFI being associated with a number of orthogonal frequency division multiplexing (OFDM) symbols used for transmission of control channels in a subframe, and code the CCFI to a CCFI codeword; and an RF amplifier configured to enable transmission of the CCFI codeword and control data to one or more subscriber stations based on the CCFI, wherein the CCFI is one of at least "01", "10", "and "11", and wherein the CCFI codeword is selected from a codebook for mapping the CCFI to the CCFI codeword, the codebook comprising at least "011011011011011011011011101101101101", "101101101101101101101101101101101110110" and "110110110110110110110110110110111011011".

22. The apparatus of claim 21, wherein CCFI is one of at least "01", "10" and "11" corresponding to "011011011011011011011011101101101101", "101101101101101101101101101101101110110" and "110110110110110110110110110110111011011", respectively.

* * * * *

UNITED STATES PATENT AND TRADEMARK OFFICE
CERTIFICATE OF CORRECTION

| | | |
|---|---|---|
| PATENT NO. | : 8,094,747 B2 | Page 1 of 1 |
| APPLICATION NO. | : 12/213012 | |
| DATED | : January 10, 2012 | |
| INVENTOR(S) | : Jianzhong Zhang | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 798 days.

Signed and Sealed this
Seventeenth Day of April, 2012

David J. Kappos
*Director of the United States Patent and Trademark Office*